Nov. 19, 1968

J. R. THOMAS 3,412,378

ELECTRONIC WARNING DEVICE

Filed April 27, 1962

INVENTOR.
James R. Thomas
BY
ATTORNEY

Nov. 19, 1968  J. R. THOMAS  3,412,378
ELECTRONIC WARNING DEVICE
Filed April 27, 1962  3 Sheets-Sheet 2

INVENTOR.
James R. Thomas
BY
ATTORNEY

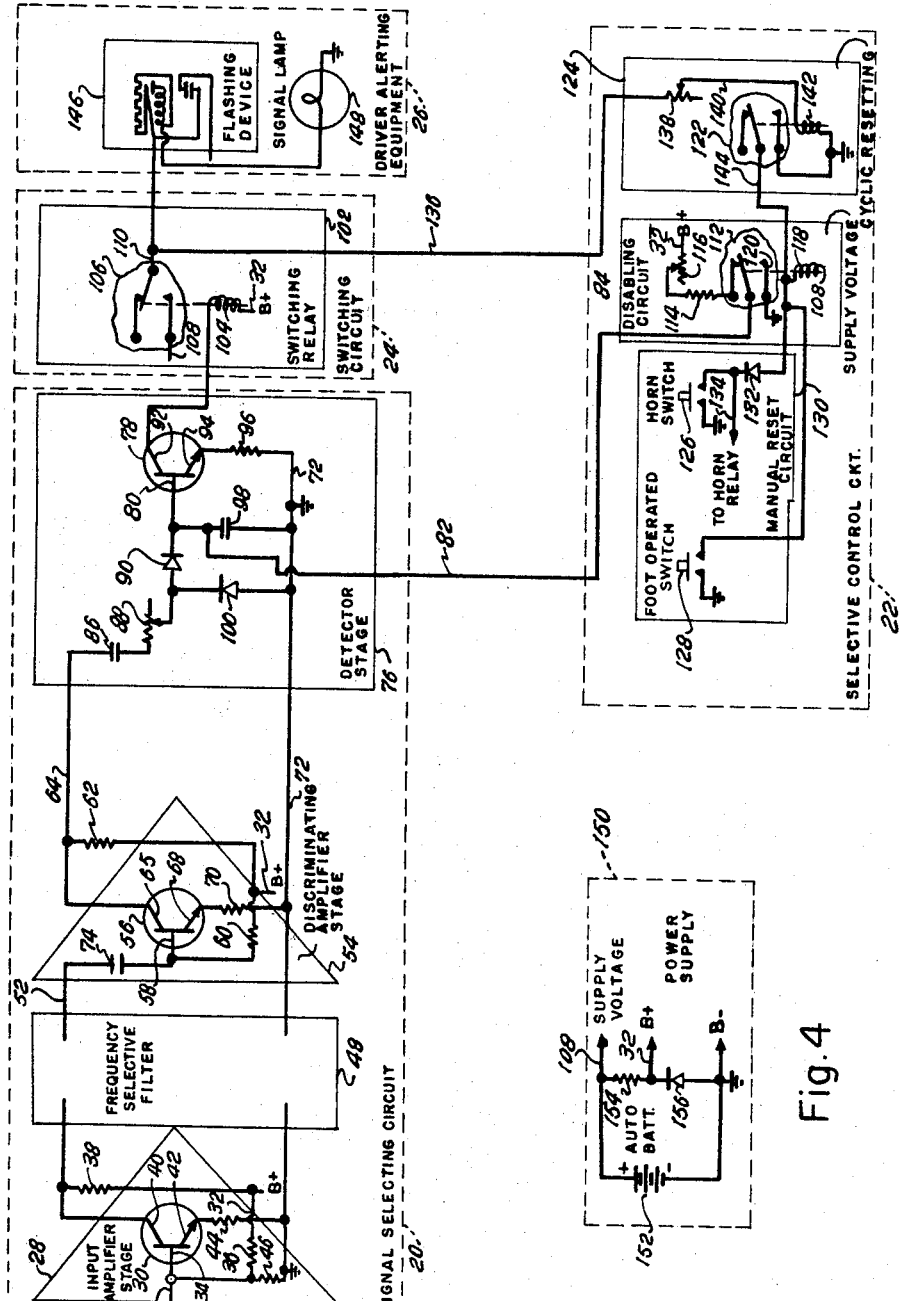

United States Patent Office 3,412,378
Patented Nov. 19, 1968

3,412,378
ELECTRONIC WARNING DEVICE
James R. Thomas, Fort Worth, Tex.
(Rte. 1, Box 105–D, Aledo, Tex. 76008)
Filed Apr. 27, 1962, Ser. No. 190,667
24 Claims. (Cl. 340—34)

This invention relates to a warning system for vehicles, and it is a primary objective of the present invention to promote public safety by the incorporation of an electric alarm system within vehicles which will either warn the vehicle operator or assist him in responding to dangerous situations in the vicinity of the vehicle. More particularly, the alarm system of the present invention will respond to sound energy generated externally of the vehicle and in the vicinity thereof by virtue of the existence of a dangerous condition or situation which cannot be detected by the vehicle operator when enclosed within a modern well insulated automobile, or other similar vehicle, which often is also provided with such operating devices as radio receivers and heaters that emit sounds internally of the vehicle so as to prevent the operator from detecting externally generated sounds which may be indicative of the dangerous condition or situation.

Such a situation often exists, for example, during weather conditions when the vehicle is tightly closed and visibility poor so that the vehicle operator may be unable to hear the warning horn of an approaching locomotive or warning bell at railroad crossings. It should, of course, be appreciated that the alarm system of the present invention also responds to other sounds which are indicative of a dangerous situation, such as the horn of an adjacent vehicle, the screeching sound of abruptly stopping vehicles, police whistles, fire, ambulance and police sirens, and other danger sound signals emitted from stationary devices.

Another object of this invention is to provide an alarm system for vehicles which responds to externally generated warning signals to provide a driver alert signal internally of the vehicle and operates other vehicle equipment in connection therewith for insuring that the driver responds properly to the dangerous situation. The alarm system therefore involves means to prevent any distraction of the driver from the alerting signal rendered.

A further object of this invention is to provide a vehicle mounted alarm system which is selective as to the danger indicating signals received so as to prevent triggering of the system by sounds that are ever present and are not indicative of a dangerous situation as well as danger indicating sounds that are too remote from the vehicle as to truly represent a dangerous situation for the vehicle.

An additional object of this invention is to provide an alarm system for vehicles in accordance with the foregoing objects, which will not respond to danger indicating signals of short duration which are also not truly representative of a dangerous situation. The alarm system of the present invention therefore provides a reliable, discriminately operative and an accurately indicating alert for the vehicle operator which avoids premature, intermittent and annoying alert signals.

These together with other objects and advantages, which will become subsequently apparent, reside in the details of construction and operation as more fully hereinafter described and claimed, reference being had to be the accompanying drawings forming a part hereof, wherein like numerals refer to like parts throughout, and in which:

FIGURE 3 is a circuit diagram of one form of alarm system.

Figure 5:
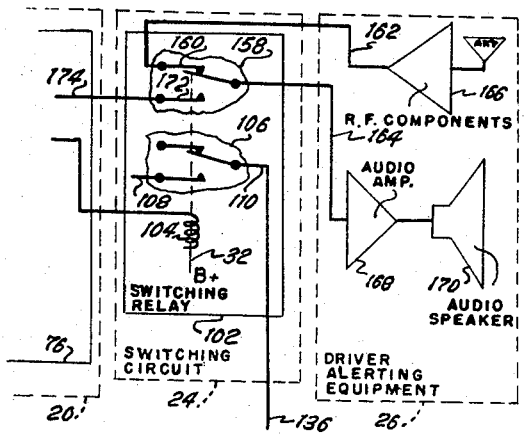

FIGURE 4 diagrammatically illustrates a power supply unit for the systems shown in FIGURES 3 and 5, and FIGURE 5 illustrates another form of the system embodying the invention.

Figure 1:
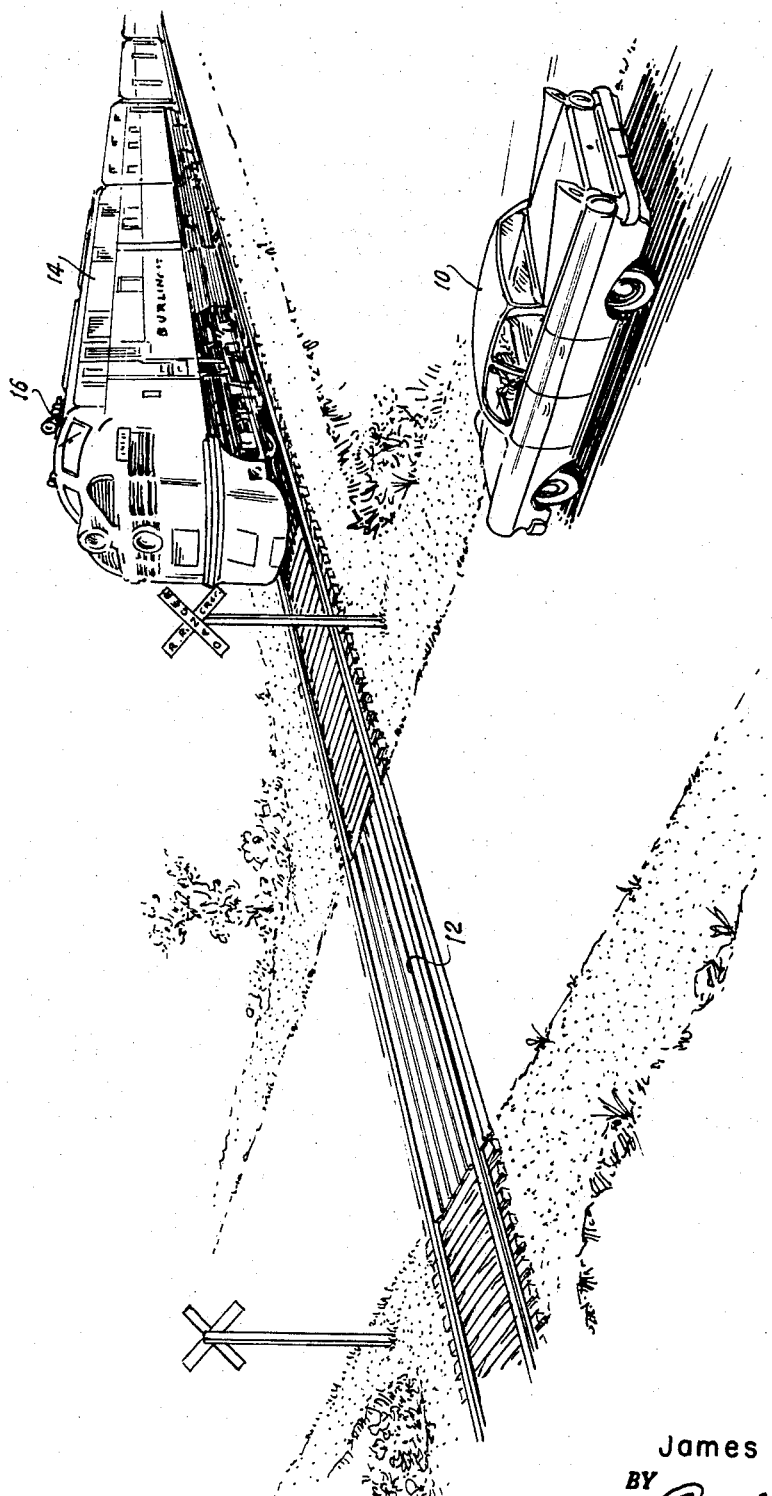
FIGURE 1 is a simplified illustration of one example of a dangerous situation to which the alarm system of the present invention will respond to alert the driver of a vehicle.

Referring now to the drawings in detail, it will be observed in FIGURE 1, that a vehicle generally referred to by reference numerals 10, when approaching a railroad crossing 12, will be a dangerous situation should a railroad locomotive 14 be within a predetermined distance range of the vehicle 10 and the railroad crossing 12 as to create the dangerous situation to which the alarm system of the present invention would respond. The locomotive accordingly includes a warning horn device 16 that is operated whenever the locomotive approaches a crossing. The horn device 16 therefore constitutes the external signal to which the alarm system within the vehicle will respond. It will, however, be appreciated that other dangerous situations, as hereinbefore indicated, may be sensed by the alarm system.

Figure 2:
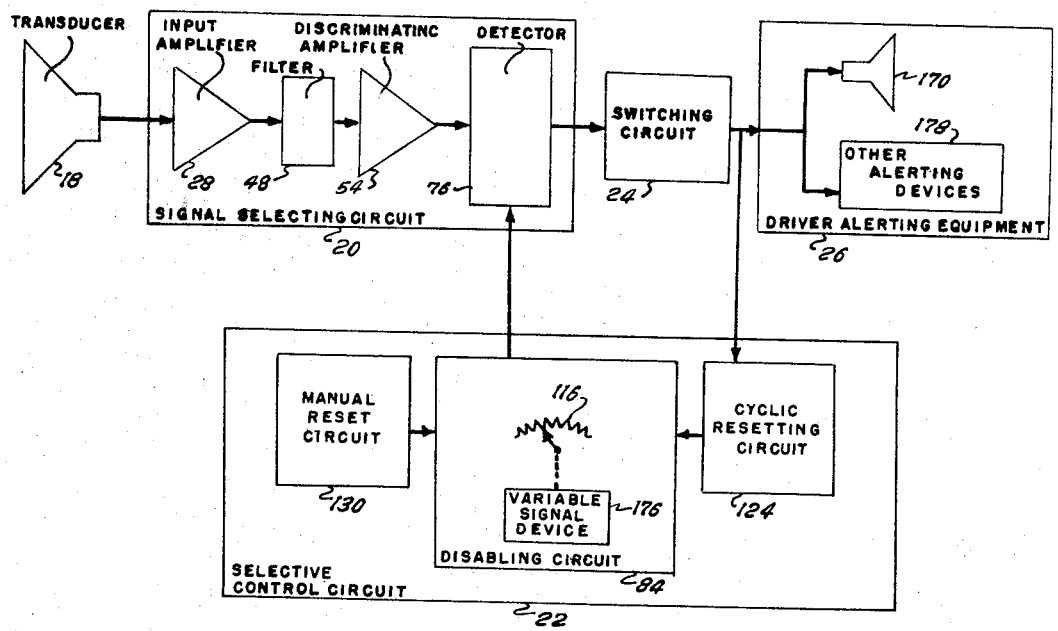
FIGURE 2 is a schematic flow diagram of an exemplary alarm system made in accordance with the principles of the present invention.

Referring now to FIGURE 2, it will be observed that the alarm system is composed of four basic components including a transducer device 18, a signal selecting circuit 20, a control circuit 22, a switching circuit 24, and the driver alerting equipment generally referred to by a reference numeral 26 mounted within the vehicle for alerting and assisting the driver to properly respond to the dangerous situation as sensed by the alarm system. As will be hereafter explained, each of the components of the system may be varied in accordance with the type of installation and conditions to which the system must respond.

One exemplary form of alarm system is illustrated in FIGURE 3 which will be specifically described. The transducer 18, which is schematically illustrated, is therefore designed to convert sound energy to electrical energy so as to provide an electrical signal to which the signal selecting circuit 20 may respond. The transducer 18 may be of any suitable type either of the dynamic or static type utilizing either carbon, crystal, or ceramic elements, and composed of either electronic, mechanical or electromechanical devices. The sound signals from the transducer are therefore fed into an input amplifier stage 28 of the circuit 20. The amplifier stage 28 may therefore include an input transistor 30 to which an initial bias may be applied by a control voltage in the conductor 32 connected to the base 34 of the transistor through the voltage dropping resistor 36.

The control voltage is also applied through the load resistor 38 across the collector 40 and emitter 42 of the transistor which is connected by a resistor 44 to ground in parallel with the base through the resistor 46. An initial voltage is therefore applied across the output terminals of the amplifier stage 28 for supply to the frequency selective filter 48, and which voltage is amplified upon receipt of a signal current in conductor 50 connected to the base 34 of the transistor to render the transistor conductive and providing an amplified input signal to the filter 48 which may be of any conventional and suitable type designed to pass current therethrough which is within a predetermined frequency range.

The filter circuit 48 is therefore designed so as to pass signal frequencies within a signal transmitting range or band of for example 300 to 600 cycles per second, or any other range that is best found to be limited to these sounds which are indicative of the dangerous situation or condition to which the alarm system responds.

The output 52 of the filter 48 is connected to a discriminating amplifier stage 54 in the signal selecting circuit 20. The transistor 56 is arranged similarly as described with respect to the transistor 30 by having its base 58 connected through the resistor 60 to a supply of control voltage in the conductor 32 which is also connected through the resistor 62 to the output line 64 of the amplifier stage 54. The collector 65 of the transistor 56 is therefore connected to the output line 64 while the emitter 68 is connected through resistor 70 to the ground 72. The base 58 of the transistor 56 is connected to the filter 48 through capacitor 74, however, so that a further amplified output in 64 will also exclude any input signals below a minimum amplitude value so as to eliminate ambient input signals that may fall within the transmitted frequency range. The output signal from the amplifier stage 54 is therefore connected by the conductor 64 to a detector stage generally referred to by reference numeral 76.

The detector stage includes a transistor 78, the base 80 of which is initially biased by a biasing voltage supplied through conductor 82 from the disabling circuit 84 of the selective control 22. The output from the amplifier stage 54 is therefore also connected to the base 80 through capacitor 86, variable resistor 88, and diode 90 to trigger the transistor in order to complete an energizing circuit through the collector 92, emitter 94, and resistor 96 to the ground line 72.

The output from the amplifier stage 54 will therefore provide triggering pulses to the transistor which are rectified and phase shifted for delayed response by the transistor. Also, the base 80 of the transistor has connected thereto a ground shunting capacitor 98 and diode 100 so as to smooth out the harmonics of the transmitted frequency characteristics of the transistor triggering signals. The transistor will therefore respond only to signals of a predetermined duration for completing the energizing circuit so as to prevent intermittent pulsing of the switching circuit 24.

The switching circuit 24 in the exemplary system disclosed in FIGURE 3, includes a switching relay generally referred to by reference numeral 102. The switching relay therefore includes a relay coil 104 through which the energizing circuit is completed by the transistor 78 as hereinbefore indicated. The relay coil 104 is therefore connected to the collector of the transistor 78 and also to the source of control voltage by connection to the conductor 32. The relay 102 also includes a normally open relay switch 106, one contact of which is connected to a source of supply voltage by conductor 108 while the other contact of the switch 106 is connected by the conductor 110 to the driver alerting equipment 26.

The selective control circuit 22, as hereinbefore indicated, includes a disabling circuit 84 by means of which an initial biasing voltage is supplied to the transistor 78 which, when disconnected, will render the detector stage 76 inoperative. The conductor 82, connected to the base 80 of the transistor 78, is therefore connected through the normally closed relay switch 112 of the disabling circuit, resistor 114, and the variable sensitivity resistor 116 to the supply of control voltage by connection of the variable resistor 116 to the conductor 32. The switch 112 is therefore open when the disabling relay coil 118 is energized so as to connect the conductor 82 to the ground contact 120.

One terminal of the disabling relay coil 118 is therefore connected to the conductor 108 for connection to a source of supply voltage. To complete a circuit through the disabling relay coil 118 for energization thereof, the other terminal of the disabling coil 118 is connected to ground alternatively by the relay switch 122 in the cyclic resetting circuit 124, the manually operated horn relay switch 126, and the foot operated grounding switch 128 of the manual reset circuit 130.

Operation of the horn relay for the horn device of the vehicle will occur upon closing the horn switch 126 which completes a circuit through the disabling relay coil 118 to ground through the rectifier diode 132. Closing of the horn switch 126 also completes a ground circuit through the horn relay by means of the conductor 134. However, should a grounded circuit be established through the disabling coil 118 prior to closing of the horn switch 126, current supplied through the diode 132 will prevent operation of the horn relay. This is desirable inasmuch as operation of the horn would be undesirable during operation of the alarm system since the alarm system may unintentionally respond to the sounds emitted by the vehicle horn.

The cyclic resetting circuit 124 is provided for the purpose of automatically resetting the alarm system after the lapse of a predetermined period of time following the supply of operating current to the driver alerting equipment 26 by closing of the relay switch 106 when the switching relay coil 104 is energized in response to a danger signal output from the detector stage 76. The conductor 110 that is connected to the relay switch 106 for supplying operating current is therefore connected by conductor 136 to a variable resistor 138 for supply of energizing current through conductor 140 to a time delay relay coil 142.

The relay coil 142 is therefore also connected to ground and when energized closes the switch 122 connected by conductor 144 to the disabling relay coil 118. Closing of the switch 122, upon energization of the time delay relay after a predetermined delay period following the supply of operating current to conductor 110, will close a grounded circuit through the disabling relay 118 to momentarily interrupt transmission of the signals through the detector stage 76. The detector stage will thereby regulate the duration of input signal to which it will respond for supplying energizing current to the switching relay coil 104.

It will be further observed that by varying the resistance value of the variable resistor 116, the amplitude of the input pulse necessary to trigger the transistor 78 may be varied by varying the biasing voltage applied through the conductor 82. Resistor 116 therefore constitutes a sensitivity control that may eliminate those danger signals that are too remote from the vehicle as to actually indicate a dangerous situation. The variable resistor 116 may therefore be controlled by any suitable device such as a vehicle speed responsive device which would, for example, require increasing the signal amplitude range should the vehicle speed increase. Alternatively, the variable resistor 116 may respond to the level of sound emitted by the vehicle engine which will vary with variations in the engine speed. Other variable regulating devices may of course be also used for controlling the position of the variable resistor 116 for similar purposes.

In the example shown in FIGURE 3, the driver alerting equipment includes a flasher device 146 that is connected to the conductor 110 and also to the supply voltage conductor 108 for the purpose of supplying an intermittent energizing current to the signal lamp 148. The alarm systems of FIGURES 3 and 5 are therefore also provided with a power supply generally referred to by reference numeral 150, and shown in FIGURE 4. The power supply may therefore include the vehicle storage battery 152 the positive terminal of which is connected to the conductor 108 for supplying the supply voltage to the flasher device 146, the disabling relay coil 118 and the normally open switching relay switch 106.

The positive terminal of the battery is also shunted by the shunting resistor 154 and the shunt regulator diode 156 for supply to the conductor 32 of a constant control voltage by means of which an initial biasing potential is applied to the transistors 30, 56 and to the transistor 78 through the variable resistor 116, normally closed disabling switch 112 and resistor 114, and for providing an energizing current through the switching relay coil 104, the collector and emitter of the transistor 78 when triggered and the resistor 96 to ground.

Referring now to FIGURE 5, it will be observed that another form of alarm system is disclosed therein which operates in a similar manner as that described with respect to FIGURE 3. The system of FIGURE 5 therefore includes the transducer, the input amplifier stage 28, the filter stage 48, the discriminator amplifier stage 54, the detector stage 76, the disabling circuit 84, the cyclic resetting circuit 124 and the manual reset circuit 130, all of which latter components are related to each other and operate in a manner similar to that described with respect to the system of FIGURE 3. Also provided in the alarm system of FIGURE 5 is the switching circuit 24 in the same relationship and operating the same manner described with respect to FIGURE 3. However, the switching circuit 24 in FIGURE 5 includes an additional two-way switch device 158 which normally connects with contact 160 for establishing an operative circuit when the switching relay coil is de-energized to the vehicle radio receiver.

The switch 158 in its illustrated position therefore closes a circuit between the conductors 162 and 164 by means of which the radio frequency receiver components 166 of the vehicle radio receiver is connected to the audio amplifier component 168 of the radio receiver to which the audio speaker 170 is connected. Accordingly, if the alarm system is not in its operating state, the radio receiver will be in its normal operation condition. However, when the alarm system is in its operating state, the switching relay coil will be energized so as to close the switch 158 onto the contact 172. As a result thereof, the radio frequency receiving components 166 of the radio receiver are disconnected from the audio amplifier which is then connected by the conductor 174 to the output of the discriminator amplifier stage 54 so that the danger indicating signals may be reproduced by the audio amplifier 168 and speaker 170 for the driver's attention.

It will, therefore, become apparent that the switching circuit may not only be utilized to initiate operation of driver alerting equipment whether it be sound reproducing equipment, or visual indicating equipment, but may also simultaneously or independently stop operation of other vehicle mounted equipment that may distract the driver from the dangerous situation to which the alarm system of the present invention responds.

With further reference to the schematic flow diagram of FIGURE 2, operation of the alarm system may be reviewed. Sound energy externally of the vehicle may therefore be picked up by the transducer 18 suitably mounted on the vehicle. The sound energy converted by the transducer is amplified by the input amplifier 28. The filter 48 passes amplified signals within a predetermined frequency range designed to exclude sensing of the alarm system of sounds that do not indicate a dangerous situation. Signals within the transmitted frequency range are therefore fed into the discriminating amplifier 54 which blocks out all signals below a minimum amplitude value so as to remove ambient sound signals which may lie within the transmitted frequency range. The output of the discriminator 54 is then fed to the detector 76 which passes signals above a minimum duration and prevents transmission of intermittent pulse signals to supply energizing current to the switching circuit 24.

In response to operation of the switching circuit 24, the cyclic resetting circuit 124 is operative through the disabling circuit 84 to periodically reset the alarm system through the detector stage 76. Also, any suitable variable signal device 176 is operative through the variable resistor 116 of the disabling circuit 84 to limit transmission through the detector 76 in response to signals exceeding a predetermined amplitude so as to regulate the range of sound signals to which the alarm system will respond.

The disabling circuit 84 is also operative under control of the manual reset device 130 to disable the alarm system when desired. When the switching circuit 24 is energized upon receipt of an operating signal from the signal selecting circuit 20, operation of a driver alerting device 170 as described with respect to FIGURE 5 or any other device 178 may be initiated. Simultaneously therewith, operation of any driver distracting device such as the radio frequency receiving components as described with respect to FIGURE 5 may be disconnected. The initiator devices 178 may include signal lamps, such as described with respect to the alarm system of FIGURE 3, pop up flags, or any vehicle control equipment, such as the brakes, should be actuated as a proper response to the dangerous condition.

It will therefore be appreciated that many operations on and in a vehicle may be initiated or ceased when a warning or danger sound is sensed by the alarm system all of which operations constitute part of the alerting action for the vehicle operator. Where the alerting action involves reproduction of the sounds being sensed as described in connection with the system of FIGURE 5 for example, the driver may also be made aware of the nature of the dangerous situation. It should be appreciated, that the alarm system may be regulated or adjusted for use with vehicles other than automotive vehicles which may also find themselves in dangerous situations that may be sensed in the manner hereinbefore described.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed is:

1. An alarm system for an enclosed vehicle or the like comprising, sensing means for receiving uncoded signal energy radiated external to the vehicle of varying frequency, amplitude and duration, signal selecting means operatively connected to the sensing means for transmitting only signal energy indicative of an externally dangerous condition, emergency operating means operatively connected to the signal selecting means and responsive to signal energy transmitted therethrough for providing warning signals internally of said vehicle for a predetermined operational period and duration control means operatively connected to the operating means and signal selecting means operative in response to said transmission of the signal energy for restricting response of the emergency operating means to radiated signal energy persisting for a predetermined duration.

2. The combination of claim 1 wherein said signal selecting means comprises input signal amplifying means operatively connected to said sensing means, filter means operatively connected to the amplifying means for transmitting audio signals within a frequency range restricted to sounds indicative of a dangerous situation, discriminator means operatively connected to said filter means for eliminating signals within said frequency range of an ambient nature and detector means operatively connected to said discriminator means and operative in response to reception of signals therefrom for transmitting only operative signals of a duration exceeding a predetermined minimum to said operating means operatively connected thereto.

3. The combination of claim 2 wherein said duration control means includes, disabling means operatively connected to said detector means and rendered operative to momentarily interrupt transmission of said operating signals to the operating means to restrict operation of the emergency operating means in response to signals of predetermined duration.

4. The combination of claim 3 wherein said duration control means further includes cyclic resetting means operatively connected to the emergency operating means and the disabling means for rendering the disabling means operative in delayed response to operating signals from the detector means for automatically resetting the alarm system after elapse of said predetermined operational period.

5. An alarm system for an enclosed vehicle or the like comprising, sensing means for receiving signals generated external to the vehicle, input signal amplifying means operatively connected to the sensing means, filter means operatively connected to the amplifying means for transmitting audio signals within a frequency range restricted to sounds indicative of a dangerous situation, discriminator means operatively connected to said filter means for eliminating signals within said frequency range of an ambient nature, detector means operatively connected to said discriminator means and operative in response to reception of signals therefrom for transmitting only operative signals of a duration exceeding a predetermined minimum, emergency operating means operatively connected to said detector means and responsive to said operative signals received therefrom for providing warning signals internally of said vehicle, disabling means operatively connected to said detector means and rendered operative to momentarliy interrupt transmission of said operating signals to the emergency operating means for restricting response of the emergency operating means to signals of a predetermined duration, cyclic resetting means operatively connected to the emergency operating means and the disabling means for rendering the disabling means operative in delayed response to the operating signals from the detector means for automatically resetting the alarm system, and manual reset means operatively connected to the emergency operating means and the disabling means for alternatively resetting the alarm system.

6. The combination of claim 5, including relay control means energized simultaneously with said manual reset means for disabling the alarm system, said relay control means being adapted to operate a vehicle mounted device to which said sensing means responds and means operatively connected to the disabling means and relay control means to prevent operation of the relay control means when the disabling means is operative.

7. The combination of claim 6, including variable control means operatively connected to the disabling means for regulating the amplitude range to which the detector means responds for transmitting operating signals to the operating means.

8. The combination of claim 7 wherein said emergency operating means comprises, switching circuit means closed in response to receipt of operating signals from the detector means and driver alerting means mounted within the vehicle operatively connected to said switching circuit means for operation in response to closing thereof.

9. The combination of claim 8 wherein said driver alerting means includes sound reproducing means operatively connected to the discriminator means and the switching circuit means for audio reproduction of danger signals received from the discriminator means in response to closing of the switching circuit means.

10. The combination of claim 9, wherein said sound reproducing means includes disconnecting means for rendering inoperative any distracting sound emitting devices mounted in the vehicle in response to closing of the switching circuit means.

11. The combination of claim 1 wherein said duration control means includes, disabling means operatively connected to said signal selecting means and rendered operative to momentarily interrupt transmission of said operating signals to the operating means to restrict operation of the operating means in response to signals of predetermined duration.

12. The combination of claim 1 wherein said duration control means includes cyclic resetting means operatively connected to the operating means for rendering the signal selecting means operative in delayed response to operating signals transmitted therefrom for automatically resetting the alarm system.

13. The combination of claim 1, including manual reset means operatively connected to the duration control means for selectively resetting the alarm system.

14. An alarm system for an enclosed vehicle or the like comprising, sensing means for receiving signals generated external to the vehicle, signal selecting means operatively connected to the sensing means for transmitting selected signals indicative of an externally dangerous condition, emergency operating means operatively connected to the signal selecting means and response to said selected signals transmitted therethrough for providing warning signals internally of said vehicle, duration control means operatively connected to the operating means and signal selecting means operative in response to transmission of said selected signals for restricting response of the operating means to selected signals of predetermined duration, manual reset means operatively connected to the duration control means for selectively resetting the alarm system, and relay control means energized simultaneously with said manual reset means for disabling the alarm system, said relay control means being adapted to operate a vehicle mounted device to which said sensing means responds and means operatively connected to the duration control means and relay control means to prevent operation of the relay control means when the duration control means is operative.

15. The combination of claim 1, including variable control means operatively connected to the duration control means for regulating the amplitude range to which the signal selecting means responds for transmitting operating signals to the operating means.

16. The combination of claim 1 wherein said emergency operating means comprises, switching circuit means closed in response to receipt of operating signals from the signal selecting means and driver alerting means mounted within the vehicle operatively connected to said switching circuit means for operation in response to closing thereof.

17. The combination of claim 16, wherein said emergency operating means further includes disconnecting means for rendering inoperative any distracting sound emitting devices mounted in the vehicle in response to closing of the switching circuit means.

18. The combination of claim 1 wherein said emergency operating means includes sound reproducing means operatively connected to the signal selecting means and the switching circuit means for audio reproduction of danger signals received from the signal selecting means in response to closing of the switching circuit.

19. In combination with a vehicle alarm system for alerting a driver of a vehicle in response to danger indicating signal energy generated externally of the vehicle, wherein said vehicle mounts at least one selectively operated device producing signals to which said alarm system responds; relay means rendered operative for selectively operating said device, duration control means operatively connected to said alarm system and operative during a predetermined delay period for delaying response of the alarm system to said danger indicating signals, manual reset means operatively connected to the duration control means and the relay means to simultaneously interrupt operation of the alarm system and render the relay means operative, and means operatively connected to the relay means and responsive to operation of the duration control means during said predetermined delay period for rendering the relay means inoperative to prevent dispatch of signals from said device that would produce undesired operation of the alarm system initiated by danger indicating signals of short duration otherwise excluded by the duration control means.

20. In combination with a moving vehicle provided with at least one signal emitting device, an alarm system comprising; signal receiving means operative to convert radiant energy into guided signal energy, signal selecting means operatively connected to said signal receiving means for restricting transmission of signal energy to a predetermined range of frequency and amplitude, driver alerting means operatively connected to said signal selecting means for operation thereof in response to said transmission of signal energy within said predetermined range of frequency and amplitude, resetting means operatively connected to the signal selecting means for periodically interrupting operation of the driver alerting means, and duration control means operatively connected to the resetting means and the signal selecting means for delaying operation of the driver alerting means limited to an operational period established by the resetting means following continuous receipt of radiant energy by the signal receiving means for a predetermined duration.

21. The combination of claim 20 including means for rendering said signal emitting device inoperative during operation of the driver alerting means to prevent distraction therefrom.

22. The combination of claim 20, including means for disabling operation of the signal emitting means during said predetermined duration to prevent operation of the driver alerting means by energy radiated by the signal emitting means.

23. The combination of claim 20, wherein said signal selecting means includes, means reflecting the speed of the moving vehicle for varying the amplitude range to which said transmission of signal energy is opertaive to produce operation of the driver alerting means.

24. The combination of claim 20, wherein said driver alerting means includes means for identifying the source of radiant energy converted by the signal receiving means.

References Cited

UNITED STATES PATENTS

| | | | |
|---|---|---|---|
| 3,182,288 | 5/1965 | Smith | 340—34 |
| 2,275,161 | 3/1942 | Schmidt | 340—34 |

FOREIGN PATENTS

| | | |
|---|---|---|
| 866,320 | 2/1953 | Germany. |
| 157,021 | 7/1954 | Australia. |
| 569,670 | 11/1957 | Italy. |
| 695,655 | 8/1953 | Great Britain. |

THOMAS B. HABECKER, *Primary Examiner.*

NEIL C. READ, *Assistant Examiner.*